United States Patent [19]

Murakami et al.

[11] Patent Number: 4,881,185

[45] Date of Patent: Nov. 14, 1989

[54] METHOD OF MEASURING TEMPERATURE AND APPARATUS FOR EFFECTING THE METHOD

[75] Inventors: Koji Murakami, Settsu; Kazuya Higeta, Osaka; Hachiro Touchi, Higashiosaka, all of Japan

[73] Assignee: Chugai Ro. Co., Ltd., Osaka, Japan

[21] Appl. No.: 30,606

[22] Filed: Mar. 27, 1987

[30] Foreign Application Priority Data

Apr. 1, 1986 [JP] Japan .................................. 61-76023
Jul. 3, 1986 [JP] Japan .................................. 61-157697
Dec. 27, 1986 [JP] Japan .................................. 61-309926
Dec. 27, 1986 [JP] Japan .................................. 61-309927

[51] Int. Cl.$^4$ .......................... G01K 13/00; G01F 1/34
[52] U.S. Cl. ................................. 364/557; 374/143; 374/40
[58] Field of Search .......................... 364/556–558, 364/510, 571.05; 374/135, 138, 141–143, 39–41, 202; 340/587, 588, 590, 591; 73/861.42, 861.44

[56] References Cited

U.S. PATENT DOCUMENTS

| | | | |
|---|---|---|---|
| 4,244,231 | 1/1981 | Teterevyatnikov | 73/861.42 |
| 4,264,423 | 4/1981 | Negas et al. | 204/195.5 |
| 4,349,282 | 9/1982 | Norfolk | 374/183 |
| 4,491,924 | 1/1985 | Agarwal | 364/557 |
| 4,604,902 | 8/1986 | Sabin et al. | 73/861.44 |
| 4,659,235 | 4/1987 | Gilmore, Jr. et al. | 374/143 |
| 4,675,834 | 6/1987 | Furuse | 364/558 |

FOREIGN PATENT DOCUMENTS

1504244 3/1977 United Kingdom.

OTHER PUBLICATIONS

French Patent Publication, vol. 19, No. 226, Oct. 1980, European Search Report, 2/24/89, 2 pages.

Primary Examiner—Parshotam S. Lall
Assistant Examiner—Brian M. Mattson
Attorney, Agent, or Firm—Birch, Stewart, Kolasch & Birch

[57] ABSTRACT

In a method and apparatus for measuring temperature by using a state change of a working fluid, a temperature measurement is executed in a manner such that the working fluid is initially supplied at a constant mass flow rate into a flow channel having a throttle portion at a temperature-sensitive portion. Upon the measurement of a pressure difference between opposite ends of the throttle portion, the temperature can be determined through a calculation using the measured pressure difference. The temperature measuring apparatus includes a source of a working fluid and a probe. The probe includes an external cylinder closed at one of its ends and an internal cylinder which is accommodated in the external cylinder and has a capillary tube at its forward end. The apparatus further includes a supply tube for introducing the working fluid from the source into either the internal cylinder or the external cylinder, and a pressure control device. A mass flow control device is further disposed in series with the supply tube to control the mass flow rate. A differential pressure gauge for detecting a pressure drop across the capillary tube and a temperature determining device for determining the temperature in accordance with a signal output from the differential pressure gauge is included in the temperature measuring apparatus.

7 Claims, 8 Drawing Sheets

METHOD OF MEASURING TEMPERATURE AND APPARATUS FOR EFFECTING THE METHOD

BACKGROUND OF THE INVENTION

The present invention generally relates to a method of measuring temperature and an apparatus employed for accomplishing this method, and more particularly, to a method and an apparatus for measuring temperature, for example, the temperature within a furnace, the temperature of a molten material, such as a molten iron or the like, by making use of a stage change resulting from a temperature change of a fluid.

Conventionally, a thermocouple, a resistance thermometer or the like has been widely employed for measurement of a high temperature within a boiler, a furnace or the like. However, since these kinds of thermometers are, in principle, restricted in material of a temperature-sensitive portion exposed to the high temperature, it has been difficult to take any countermeasure against oxidization or other causes shortening the life of the thermometer, and accordingly, such thermometers are generally improper to be used for a long time.

Figure 1:
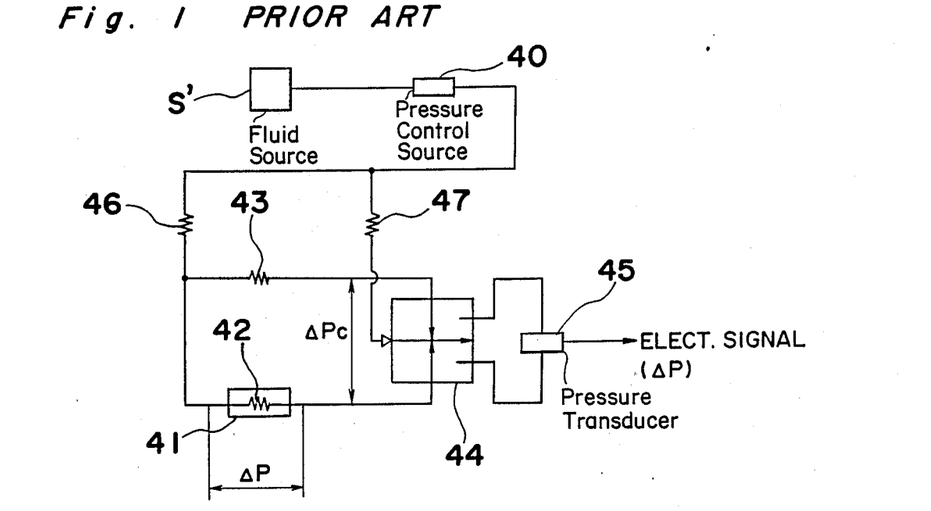
FIG. 1 is a diagrammatic view of a conventional fluidic pyrometer.

Accordingly, there has been developed a temperature measuring apparatus of fluidic resistance type or a fluidic pyrometer which offers an advantage such that a material of a probe, i.e. a temperature sensor forming a temperature-sensitive portion, can be freely selected in view of its life without any restriction by a measuring principle. As for the principle of the fluidic resistance type temperature measuring apparatus, the temperature is detected through a change of pressure drop of a gas at the time when it passes through a throttle portion such as a capillary tube, by making use of a temperature dependence of a viscosity coefficient of the gas. FIG. 1 illustrates a fundamental construction of the temperature measuring apparatus of the above described type in which a working fluid, such as Ar gas or the like, is initially supplied from a source S' of the working fluid at a constant pressure through a pressure control device 40. The pressure drop $\Delta P$ across the capillary tube 42 within the probe 41 which arises in correspondance with the temperature of an atmosphere to be measured is detected as a pressure difference $\Delta Pc$ between the pressure on the secondary side of a trim valve 43 and the pressure on the secondary side of the capillary tube 42. Thereafter, upon amplification of the pressure difference $\Delta Pc$ by a fluidic element 44, the pressure difference is detected as an electric signal by a pressure transducer 45.

Such a system is substantially similar in construction to a kind of electric circuit called a Wheatstone bridge, and a slight fluctuation of the pressure drop at a sensitivity set valve 46, an amplifier supply valve 47, or the trim valve 43 exerts a large influence upon the pressure signal from the fluidic element 44. Accordingly, a state change of the working fluid caused by an environmental temperature causes the fluctuation with respect to the pressure drop at each of the aforementioned valves 46, 47 and 43. Since this fact is, in appearance, regarded as a fluctuation of the pressure drop $\Delta P$ at the capillary tube 42 within the probe 41, i.e. a change in temperature detected by tne probe 41, the temperature measuring apparatus of this kind has a disadvantage because it can be subjected to the influence of the environmental temperature.

In addition, in the aforementioned fluidic resistance type temperature measuring apparatus, when the probe 41 as the temperature-sensitive sensor is damaged, for example, it is cracked or a hole is accidentally made in it causing the working fluid to spill out or the atmosphere to enter the probe 41, the signal outputted from the pressure transducer 45 will continuously output a signal that does not correctly correspond to the temperature being measured.

The damage of the probe in the fluidic resistance type temperature measuring apparatus is substantially equivalent to burnout with respect to the thermocouple. However, although no signal is outputted in the case of burnout, the wrong signal is continuously outputted in the fluidic resistance type temperature measuring apparatus. It is, therefore, difficult to detect the damage of the probe 41, and in the case where the temperature is controlled through its measurement, for example, by the fluidic resistance type temperature measuring apparatus, the temperature will be controlled undesirably to a value different from the predetermined one. This is another shortcoming of the fluidic resistance type temperature measuring apparatus.

Figure 2:
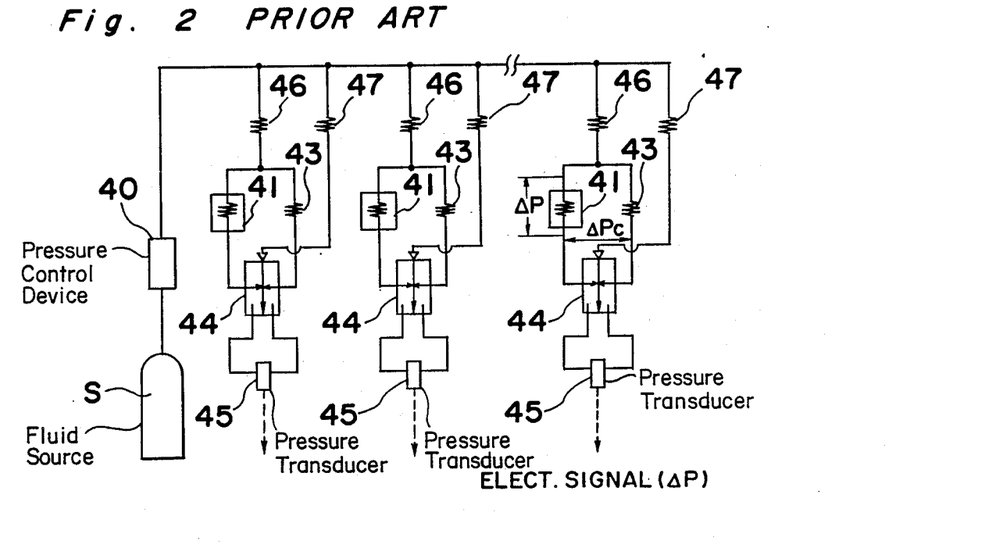
FIG. 2 is a schematic view of one example of a multi-temperature measuring apparatus employing the fluidic pyrometer of FIG. 1.

On the other hand, in the case where the temperature within the furnace is controlled, the temperature measurement is generally executed simultaneously at a plurality of locations within the furnace. Accordingly, when the aforementioned fluidic resistance type temperature sensor is employed in a multi-temperature measuring apparatus, it is considered, as shown in FIG. 2, that the plural sets of the fluidic resistance type temperature sensors are connectively juxtaposed with each other, with the source S of supply of the working fluid and the pressure control device 40 being commonly used between them. Such construction, however, undesirably produces some new problems different from the aforementioned ones.

A first problem is that since the environmental temperatures are different for each of the locations or points where the amplifier supply valves 47, sensitivity set valves 46 and trim valves 43 generating the reference pressure drop are provided, all of these valves being located at the upstream side of each probe, the points to be measured in temperature undergo influences by the environmental temperatures which differ from each other. In other words, there occur measurement errors because of the temperature difference from one location to another measurement location making it impossible to correct the measurement errors.

A second problem is that it is impossible to supply the working fluid to each probe at a constant pressure. More specifically, the source S of the working fluid and the pressure control device 40 are commonly used, and therefore, since the pipings for supplying the working fluid to each probe 41 is inevitably long, a pressure fluctuation is produced in the working fluid while in the pipings because of the influence of the environmental temperature. As a result, this phenomenon causes a large measurement error in temperature.

Figure 3:
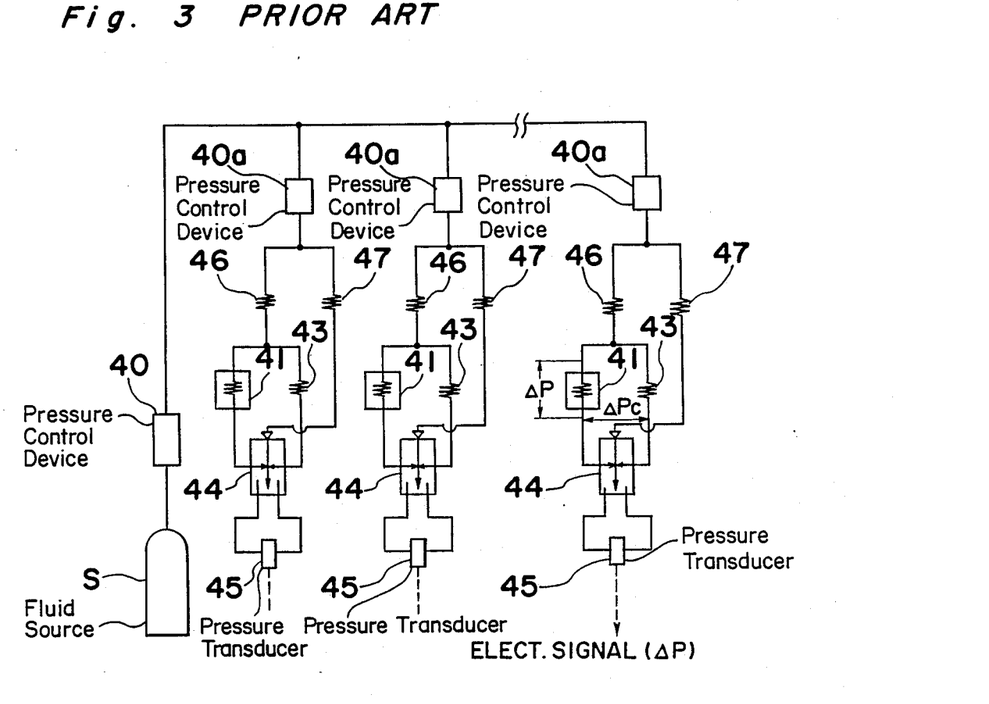
FIG. 3 is a schematic view showing another example of the device of FIG. 2.

As shown in FIG. 3, it is possible to supply the working fluid to each probe at the constant pressure, by restricting the pressure fluctuation occurring in the pipings being restricted. This restriction is accomplished by using additional correcting pressure control devices 40a for provided immediately before each temperature sensor unit. However, since the pressure fluctuation on the primary side of each pressure control device 40a is large, the pressure cannot be fully controlled. Accordingly, not only the measurement error in temperature becomes undesirably large, but also a plurality of the pressure control devices for correction use are inevitably needed. The number of these extra pressure control devices needed corresponds to the number of points used to measure temperature. These additional devices cause the temperature measuring apparatus to be manufactured at an undesirably increased cost, thereby causing the third problem.

A fourth problem is that since the multi-temperature measuring apparatus as shown in FIG. 2 or 3 has a plurality of the temperature sensor units that are juxtaposely connected with each other at the downstream side of the source S of the working fluid, it is necessary to supply the working fluid at a constant pressure to each unit, thereby causing the consumption of the working fluid to undesirably increase proportionately to the increased number of the points used for measuring.

SUMMARY OF THE INVENTION

Accordingly, the present invention has been developed to substantially eliminate the above described disadvantages inherent in the prior art method and apparatus for measuring temperature, and has for its essential objective to provide an improved method and apparatus for measuring temperature which is capable of measuring high temperatures without any influence upon a working fluid caused by the environmental temperature or the temperature of the working fluid.

Another important objective of the present invention is to provide the temperature measuring apparatus of the above described type which is capable of preventing a measurement error by detecting if a temperature sensor is damaged.

A further objective of the present invention is to provide the temperature measuring apparatus of the above described type which is capable of sequentially measuring high temperatures, with excellent accuracy, at a plurality of locations, while utilizing the working fluid effectively.

In accomplishing these and other objectives, according to one preferred embodiment of the present invention, there is provided a method of measuring temperature through a change of state of a fluid. This method includes the steps of supplying a working fluid at a constant mass flow rate into a flow channel, defining a throttle portion in the flow channel at a temperature-sensitive portion, measuring a pressure difference between opposite ends of the throttle portion, and calculating the temperature from the measured pressure difference.

In another embodiment of the present invention, there is provided a fluidic resistance type temperature measuring apparatus including a source of a working fluid; a probe having an external cylinder closed at one of its ends, and an internal cylinder which is accommodated in the external cylinder, and a capillary tube at the internal cylinder's forward end; a supply tube of the working fluid for introducing the working fluid from the source into either the internal cylinder or the external cylinder; a pressure control device and a mass flow control device disposed in series with the supply tube; a differential pressure gauge for detecting a pressure drop across the capillary tube, and a temperature calculating means for operating the temperature on the basis of a signal sent from the differential pressure gauge.

In a further embodiment of the present invention, a fluidic resistance type temperature measuring apparatus includes a source of a working fluid; a plurality of probe connected in series with each other; each probe having an external cylinder closed at one of its ends, and an internal cylinder which is accommodated in the external cylinder, and a capillary tube at the internal cylinder's forward end; a supply tube of the working fluid connected to a first probe to introduce the working fluid from the source into the first probe; a pressure control device and a mass flow control device disposed in series with of the supply tube; a plurality of differential pressure gauges, each gauge corresponding to each probe to detect a pressure drop across the capillary tube; and a temperature operating means for calculating the temperatures on the basis of signals sent from each respective differential pressure gauges.

BRIEF DESCRIPTION OF THE DRAWINGS

These and other objectives and features of the present invention will become apparent from the following description taken in conjunction with the preferred embodiments thereof with reference to the accompanying drawings, throughout which like parts are designated by like reference numerals, and in which.

DETAILED DESCRIPTION OF THE PREFERRED EMBODIMENT

Figures 4, 5:
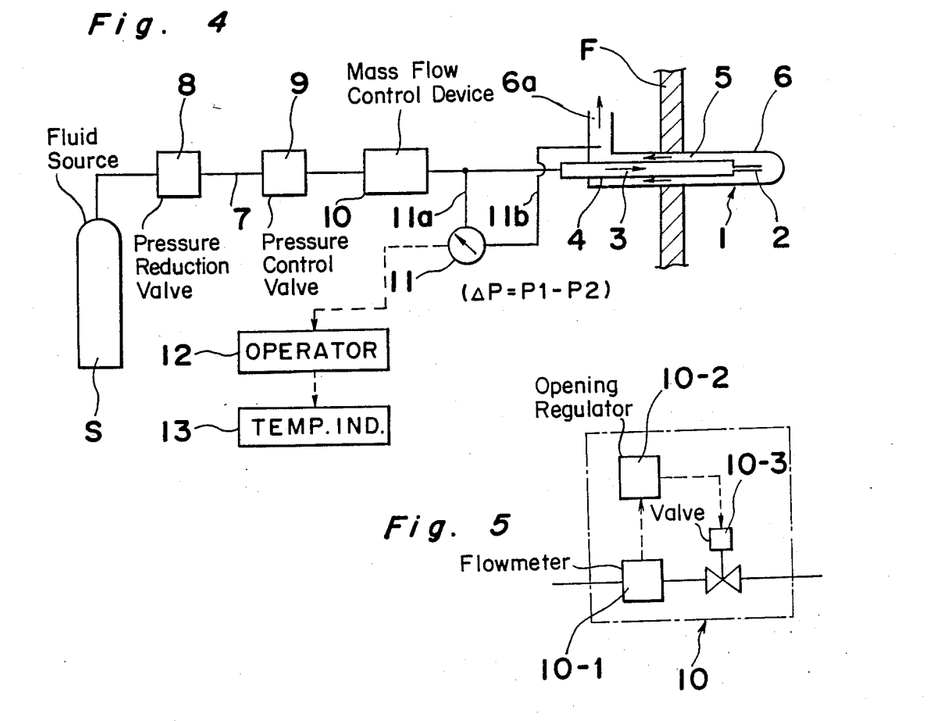
FIG. 4 is a schematic view of a fluidic resistance type temperature measuring apparatus according to a first embodiment of the present invention.
FIG. 5 is a schematic view of a mass flow control device employed in the temperature measuring apparatus of FIG. 4.

Referring now to the drawings, there is shown in FIG. 4, a temperature measuring apparatus according to a first embodiment of the present invention, which is provided with a probe 1 or a temperature sensor as a temperature-sensitive portion; a source S of a working fluid for supplying the working fluid to the probe 1; and the like. The probe 1 is composed of an internal cylinder 4 having, at its forward end, a capillary tube 2 which assumes a form of a throttle portion and an external cylinder 6 having one closed end. The probe 1 is set, for example, across a furnace wall F as shown in FIG. 4, to measure a temperature within the furnace. The source S of the working fluid is connected with the internal cylinder 4 through a reducing valve 8, a pressure control device 9, a mass flow control device 10 and pipings 7 so that the highly pressurized working fluid may be supplied from the source S into the internal cylinder 4 sequentially through the reducing valve 8, the pressure control device 9 and the mass flow control device 10. A first flow channel 3 of the working fluid is defined within the internal cylinder 4 and a second flow channel 5 is formed between the internal cylinder 4 and the external cylinder 6.

As shown in FIG. 5, the mass flow control device 10 includes a mass flowmeter 10-1, a valve-opening regulator 10-2 and a valve 10-3 so that the mass flow of the working fluid sequentially supplied from the source S is detected by the mass flowmeter 10-1 to be compared with a predetermined value in th valve-opening regulator 10-2. The regulator 10-2, then controls the opening of the valve 10-3 in accordance with the comparison result in order to keep the mass flow rate constant.

There is also provided a differential pressure gauge 11 connected with an inlet portion of the internal cylinder 4 and an outlet portion of the external cylinder 6 through pressure detecting tubes 11a and 11b respectively to detect a pressure drop ΔP across the capillary tube 2 within the probe 1. The differential pressure gauge 11 is further coupled to a temperature operator 12 for calculating the temperature in accordance with an output signal from the differential pressure gauge 11. The temperature operator 12 is also coupled to a temperature indicator 13 for indicating the temperature. The temperature within the furnace is measured through detection of the aforementioned pressure drop ΔP by the differential pressure gauge 11, as will be described in detail below.

A method for measuring the temperature will be explained below with the use of the temperaure measuring apparatus having the above described construction.

A highly pressurized working fluid such as Ar gas or the like is initially supplied from the source S of the working fluid. The working fluid supplied from the source S is reduced in pressure down to a predetermined value by the reducing valve 8 and the pressure control device 9. The gas is then supplied to the first channel 3, i.e. the internal cylinder 4 within the probe 1 at a constant rate of mass flow Q caused by the mass flow control device 10.

The working fluid supplied to the probe 1 at the constant mass flow rate Q is discharged to the atmosphere from a discharge port 6a of the external cylinder 6 through the capillary tube 2 of the internal cylinder 4. At this moment, the pressure drop ΔP arises at the portion of the capillary tube 2. The pressure drop is calculated in the below equation by having the temperature T within the probe 1, the inner diameter d and the length l of the capillary tube 2 at the temperature T, and the viscosity coefficient μ(T) and the density ρ(T) of the working fluid at the same temperature.

$$\Delta P = \frac{8 \cdot \mu(T) \cdot l}{\pi \cdot (d/2)^4} \cdot \frac{Q}{\rho(T)} \quad (1)$$

More specifically, the following Hagen-Poiseuille equation is established with respect to a volumetric flow rate Qv flowing within the capillary tube 2.

$$Qv = \frac{\pi}{8} \cdot \frac{(d/2)^4}{\mu(T)} \cdot \frac{\Delta P}{l} \quad (2)$$

In addition, the following equation (3) is established between the volumetric flow rate Qv and the mass flow rate Q.

$$Q = \rho(T) \cdot Qv \quad (3)$$

Accordingly, the equation (1) can be obtained.

Besides, when the kinematic viscosity of the working fluid is represented by ν(T), $$\nu(T) = \mu(T)/\rho(T). \quad (4)$$

the equation (1) is derived as follows.

$$\Delta P = \frac{8 \cdot Q}{\pi} \cdot \frac{l}{(d/2)^4} \cdot \nu(T) \quad (5)$$

Consequently, when a fluid such as Ar gas or the like which change in state is known by temperature is employed as the working fluid, and since ν(T) is known and the mass flow rate Q is constant, ΔP is represented as a function of temperature T, thus resulting in that the temperature T can be calculated through detection of ΔP i.e., the differential pressure between a pressure P1 within the first channel 3 and another pressure P2 at the discharge port 6a of the working fluid, by the differential pressure gauge 11. The temperature dependence on the kinematic viscosity ν(T) is generally extremely large as compared with a change in the inner diameter or the length of the capillary tube caused by a thermal expansion. Accordingly, there is practically little problem in considering from the equation (5) that ΔP is substantially dependent upon ν(T).

Figure 6:
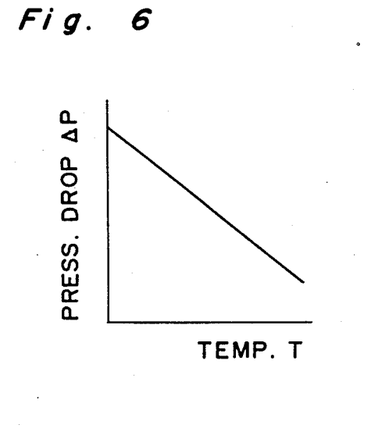
FIG. 6 is a graph showing a relation between a pressure drop across a capillary tube disposed within a temperature sensor employed in the temperature measuring apparatus of FIG. 4 and a temperature of the working fluid in the case where a liquid is employed as a working fluid.
Figure 7:
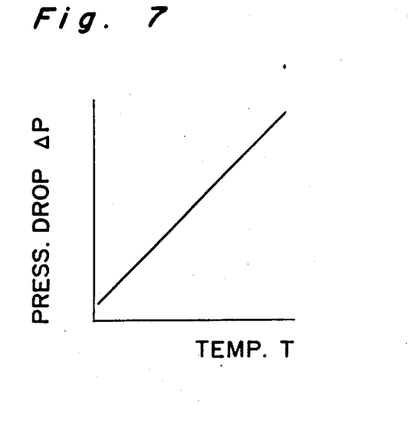
FIG. 7 is a graph similar to that of FIG. 6 in the case where a gas is employed as the working fluid.
Figure 8:
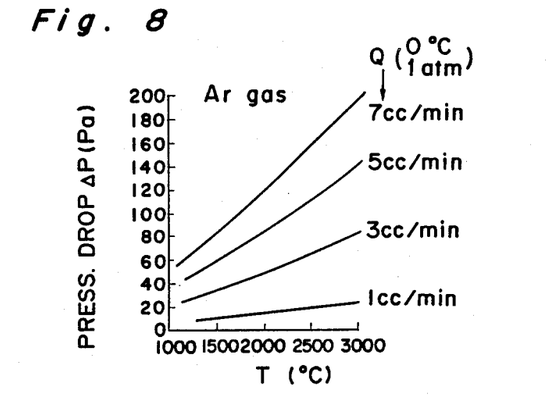
FIG. 8 is a graph similar to that of FIG. 7 in the case where Ar gas is employed as the working fluid, with a mass flow being a parameter.
Figure 9:
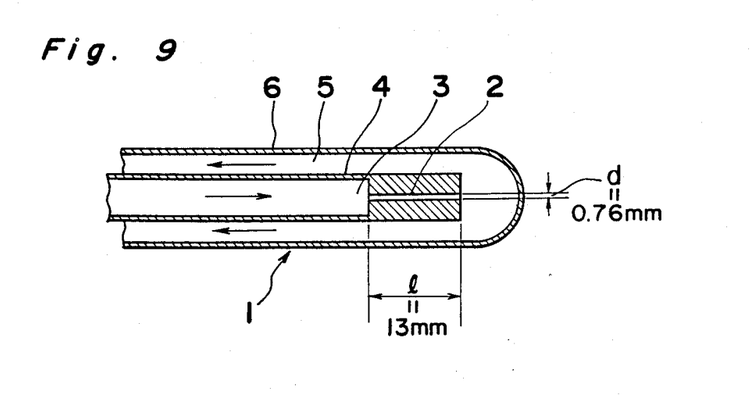
FIG. 9 is a fragmentary sectional view of a probe employed as a temperature sensor, which provides the data for the graph of FIG. 8.

It is noted that although the working fluid may be either a gas or a liquid, the gas is superior to the liquid in resolving power with respect to temperature, since the former is generally highly dependent upon the temperature as compared with the latter. As a rule, the kinematic viscosity of the liquid decreases as the temperature rises, and on the contrary, the kinematic viscosity of the gas increases as the temperature rises. Accordingly, the relation between the pressure drop ΔP and the temperature is graphically shown in FIG. 6 in the case where the liquid is employed as the working fluid or in FIG. 7 in the case where the gas is employed as the working fluid. FIG. 8 graphically shows one example of the latter in which the mass flow rate Q of the working fluid is made a parameter on condition that the capillary tube 2 within the probe 1 is made up of tungsten having a thermal expansion coefficient of $20 \times 10^{-6}/°C$. and the inner diameter d and the length l are, respectively, 0.76 m and 13 mm at a temperature of 0° C. as shown in FIG. 9 with Ar gas being employed as the working fluid. Since the pressure drop ΔP becomes more highly dependent upon the temperature as the mass flow rate Q increases, it appears that the temperature measuring apparatus is improved both in temperature resolving power and in accuracy. However, when the flow exceeds an appropriate amount, the heat transfer within the probe 1 does not correspond to the flow, and the temperature difference between the fluid and the atmosphere within the furnace becomes large, thus causing an incorrect temperature of the atmosphere to be indicated. Accordingly, since the flow of the working fluid would be inevitably restricted at its upper limit which largely depends upon the construction, configuration and dimensions of the probe 1, these limits of the probe 1 are required to be determined experimentally.

Figure 10:
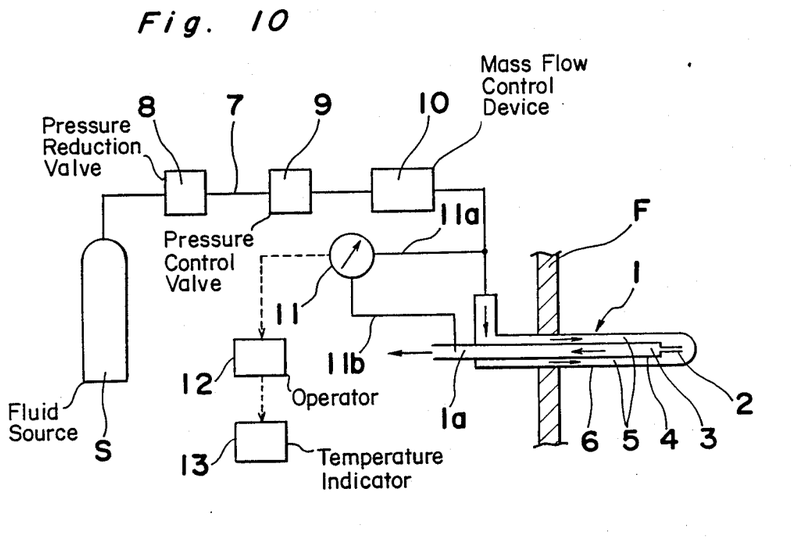
FIG. 10 is a schematic view showing a second embodiment of the present invention.

FIG. 10 shows the temperature measuring apparatus according to a second embodiment of the present invention, in which the working fluid is supplied to the second channel 5 formed between the internal cylinder 4 and the external cylinder 6 of the probe 1 and is then fed into the first channel 3 within the internal cylinder 4 through the capillary tube 2 to be discharged from the probe 1. The pressure drop ΔP across the capillary tube 2 which is an output of the temperature measuring apparatus of the fluidic resistance type, is determined by the temperature of the working fluid in the capillary tube 2, as described above. In view of only this fact, if the inside of the probe 1 decreases in thermal resistance, the temperature measurement is feasible as long as the measurement is performed with respect to a steady temperature or a gradual change of the temperature in the case where the working fluid is caused to flow from the internal cylinder 4 towards the external cylinder 6 as shown in FIG. 4 as well as in the case shown in FIG. 10.

In the case shown in FIG. 4, however, since there exists the second channel 5, i.e. the discharge channel of the working fluid between the first channel 3 and the external cylinder 6 of the probe 1, the temperature measuring apparatus of this kind decreases in its response characteristic. Accordingly, when there exists a rapid change of the temperature within the furnace, it is desired that the working fluid is caused to flow as shown in FIG. 10.

Figure 11:
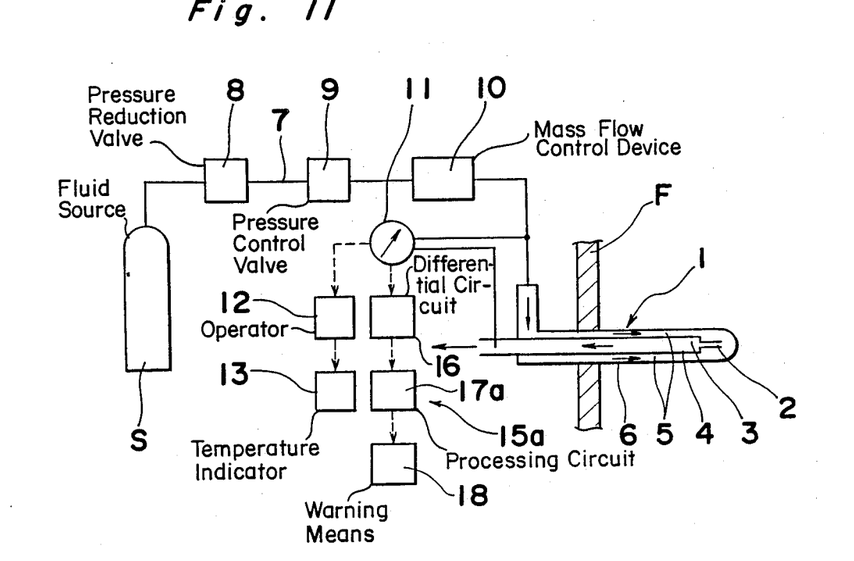
FIG. 11 is a schematic view of the fluidic resistance type temperature measuring apparatus of the present invention having a probe damage detecting means.

In FIG. 11, the temperature measuring apparatus of the fluidic resistance type is further provided with a probe damage detecting means 15a which includes a differentiation circuit 16, a comparative operation processing circuit 17a and a warning means 18, all of which are sequentially connected with one another in this order with the differentiation circuit 16 also being coupled with the differential pressure gauge 11. The differentiation circuit 16 differentiates a signal representing the pressure drop ΔP sent from the differential pressure gauge 11 with respect to time to calculate a fluctuating rate of the pressure drop ΔP. Upon comparing the fluctuating rate with a predetermined reference fluctuating rate using a comparative operation processing circuit 17a, if the pressure drop ΔP has an abnormal fluctuating rate, an abnormal signal is emitted from the comparative operation processing circuit 17a to cause warning means 18 to emit the warning.

An operating principle of the probe damage detecting means 15a will be explained below, by way of example, with reference to the temperature measuring apparatus of FIG. 11.

Consideration will be given with respect to a case where the external cylinder 6 of the probe 1 has been damaged from the condition that the pressure within the furnace is higher than the pressure within the probe 1. Since the pressure P0 within the furnace is higher than the pressure P1 within the probe 1, a part of the gas which forms the atmosphere within the furnace flows into the probe 1 and pass through the capillary tube 2, together with the working fluid. As a result, since the pressure drop ΔP detected by the differential pressure gauge 11 instantaneously increases simultaneously with the damage to the probe 1, the fluctuating rate dΔP/dt will become greater than the fluctuating rate corresponding to the fluctuation of the temperature within the furnace. More specifically, supposing that the temperature within the furnace fluctuates instantaneously from T1 to T2, the pressure drop ΔP12 produced through the capillary tube 2 of the probe 1 is detected with a time lag represented by a time t1 required for the external surface of the external cylinder 6 of the probe 1 to turn from T1 to T2 in temperature, a time t2 required for the internal surface of the external cylinder 6 to become T2 in temperature and a time t3 required for the working fluid to become T2 in temperature. The time lags t1 and t3 are influenced greatly by the components, pressure, flow condition or the like of the atmosphere and by the pressure, flow condition or the like of the working fluid and accordingly making it actually difficult to forecast or recognize these time lags t1 and t3. On the contrary, the time lag t2 can be substantially estimated by the following equation, since a thermal transfer coefficient α and the wall thickness w of the probe 1 are known.

$$t2 = w/16\alpha \quad (6)$$

Accordingly, the fluctuating rate ΔP12/dt of the aforementioned pressure drop ΔP12 can be expressed by the following equation (7), when the pressure drops corresponding to the temperatures T1 and T2 within the furnace are represented respectively by ΔP1 and ΔP2.

$$\left| \frac{d\Delta P12}{dt} \right| = \left| \frac{\Delta P2 - \Delta P1}{t1 + t2 + t3} \right| < \left| \frac{\Delta P2 - \Delta P1}{t2} \right| \quad (7)$$

The equation (7) means that the fluctuating rate $$\left| \frac{dP12}{dt} \right|$$

of the pressure drop detected by the differential pressure gauge 11 does not exceed at least $$\left| \frac{\Delta P2 - \Delta P1}{t2} \right|,$$

unless the probe 1 has been damaged.

On the other hand, when ΔPmax and ΔPmin respectively represents the pressure drop corresponding to the upper temperature limit Tmax and the lower temperature limit Tmin within the temperature measuring range of the temperature measuring apparatus of the fluidic resistance type, the fluctuating rate $$\left(\frac{d\Delta P}{dt}\right)_{max}$$

of the pressure drop detected by the temperature measuring apparatus can be expressed as follows:

$$\left|\left(\frac{d\Delta P}{dt}\right)_{max}\right| = \left|\frac{\Delta Pmax - \Delta Pmin}{t1 + t2 + t3}\right| < \qquad (8)$$

$$\left|\frac{\Delta Pmax - \Delta Pmin}{t2}\right|$$

The predetermined reference fluctuating rate is represented by $$\left|\frac{\Delta Pmax - \Delta Pmin}{t2}\right|$$

in accordance with the aforementioned equation (8), and the output signal from the differential pressure gauge 11 is differentiated with respect to time by the differentiation circuit 16 so that the fluctuating rate $$\left|\frac{d\Delta P}{dt}\right|$$

of the detected pressure drop may be obtained. Upon comparing the fluctuating rate of the detected pressure drop with the predetermined reference fluctuating rate in the comparative operation processing circuit 17a, when the former is greater than the latter, i.e.

$$\left|\frac{\Delta Pmax - \Delta Pmin}{t2}\right|,$$

it is judged that the probe 1 has been damaged, and the abnormal signal is emitted to cause the warning means to emit the warning.

An explanation will be made below in the case where the pressure PO within the furnace is lower than the pressure P1 within the probe 1.

When the external cylinder 6 of the probe 1 has been damaged as described above, a part of the working fluid having entered the probe 1 flows into the furnace. As a result, the pressure drop ΔP detected by the differential pressure gauge 11 rapidly decreases simultaneously with the damage of the probe 1 and the fluctuating rate $$\left|\frac{d\Delta P}{dt}\right|$$

of the detected pressure drop in this event is greater than the predetermined reference fluctuating rate as described so far.

In the same manner as described above, the output signal from the differential pressure gauge 11 is differentiated with respect to time by the differentiation circuit 16 so that the fluctuating rate $$\left|\frac{d\Delta P}{dt}\right|$$

of the detected pressure drop may be obtained. Upon comparing the fluctuating rate $$\left|\frac{d\Delta P}{dt}\right|$$

with the predetermined reference fluctuating rate $$\left|\frac{\Delta Pmax - \Delta Pmin}{t2}\right|$$

in the comparative operation processing circuit 17a, if the former is greater than the latter, it is judged that the probe 1 has been damaged and the abnormal signal is emitted to cause the warning means 18 to emit the warning.

Accordingly, in the case where the following equation is established, the warning is emitted from the warning means 18.

$$\left|\frac{d\Delta P}{dt}\right| > \left|\frac{\Delta Pmax - \Delta Pmin}{t2}\right| \qquad (9)$$

Figure 12:
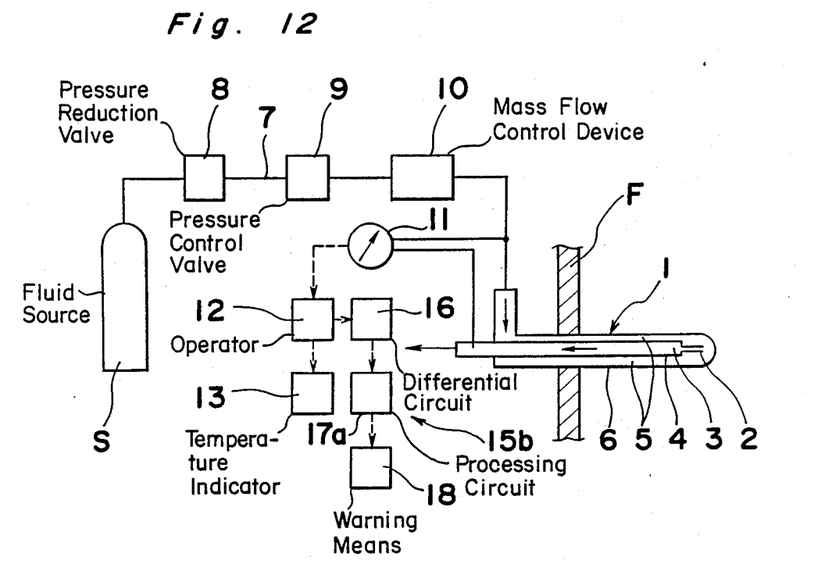
FIG. 12 is a schematic view showing another example of a probe damage detecting means.

It is to be noted that although the differentiation circuit 16 is coupled to the differential pressure gauge 11 in the temperature measuring apparatus of FIG. 11, the probe damage detecting means 15b may be provided with the differentiation circuit 16 coupled to the temperature operator 12, as shown in FIG. 12. Also, in this case, after the detected pressure drop ΔP has been converted into temperature by the temperature operating means 12, the temperature signal is inputted into the differentiation circuit 16 so that a fluctuating rate of the operating temperature may be calculated instead of the detected pressure drop ΔP. Upon comparing the calculated fluctuating rate of the operating temperature with a reference fluctuating rate in the comparative operation processing circuit 17a, the damage of the probe 1 can be readily detected.

It is also noted that the predetermined reference fluctuating rate is not limited by that described so far on the basis of the measuring apparatus of the present invention, but the fluctuating rate of the pressure drop, temperature or the like corresponding to, for example, a heat curve of a material to be treated may be appropriately selected as the reference fluctuating rate.

Figure 13:
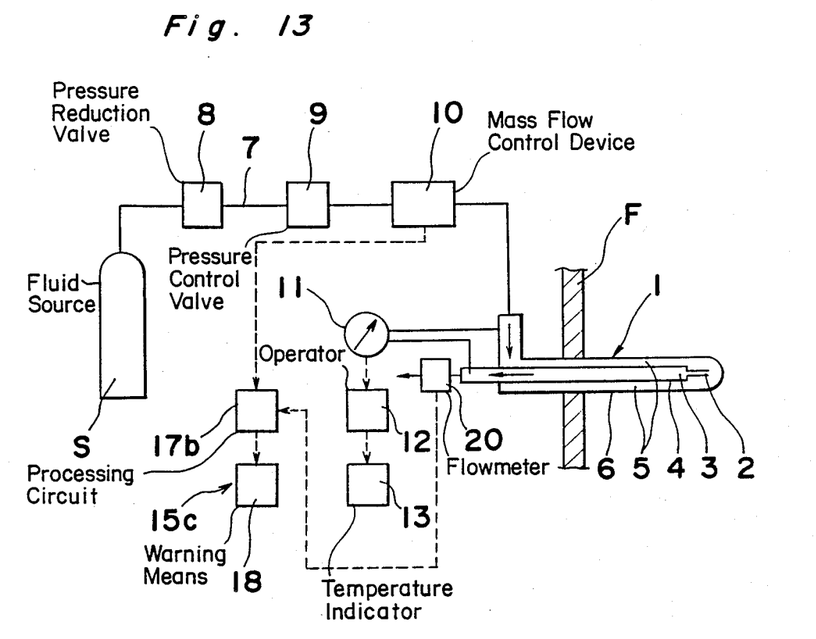
FIG. 13 is a schematic view showing still another example of a probe damage detecting means.

Moreover, as shown in FIG. 13, it may be modified such that the probe damage detecting means 15c is provided with a mass flowmeter 20 for detecting the mass flow of the working fluid on the discharge side of the working fluid of the probe 1 and the comparative operation processing circuit 17b coupled to both of the mass flowmeter 20 and the above-mentioned mass flowmeter 10-1 of the mass flow control device 10. The damage of the probe 1 is detected by comparing, in the comparative operation processing circuit 17b, the mass flow of the working fluid on the supply side and the mass flow on the discharge side of the working fluid of the probe 1, i.e. the flow signal from the mass flow control device 10 and that from the mass flowmeter 20. In other words, when the probe 1 is undamaged, both flow signals coincide with each other. On the contrary, when the probe 1 has been damaged, they inevitably disagree with each other. Accordingly, when the discrepancy has been detected in the comparative operation processing circuit 17b, the abnormal signal is emitted to cause the warning means 18 to emit the warning.

Figure 14:
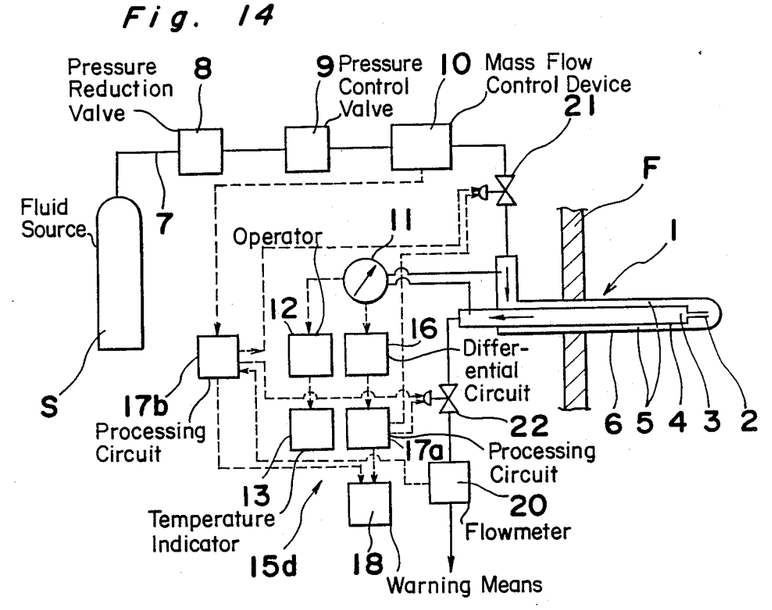
FIG. 14 is a schematic view showing a further example of a probe damage detecting means.

In addition, the apparatus may be further modified such that the probe damage detecting means comprises a first probe damage detecting portion for detecting the damage of the probe 1 by detecting the change of the fluctuating rate of the pressure drop $\Delta P$ or the temperature and a second probe damage detecting portion for detecting the damage of the probe 1 by detecting the discrepancy between the mass flows. There is shown in FIG. 14, one example of the probe damage detecting means 15d having the first probe damage detecting portion, i.e. the probe damage detecting means 15a and the second probe damage detecting portion, i.e. the probe damage detecting means 15c, wherein a couple of solenoid valves 21 and 22 are disposed respectively on the supply side and on the discharge side of the working fluid of the probe 1 so as to close on the occasion when the probe 1 is damaged.

It should be noted that although either of the probe damage detecting means 15a, 15b, 15c and 15d described so far is employed in the temperature measuring apparatus having the probe 1 in which the working fluid flows from the external cylinder 6 towards the inside of the internal cylinder 4. The working fluid may be caused to flow within the probe 1 from the inside of the internal cylinder 4 towards the external cylinder 6, as shown in FIG. 4. In this case, the damage of the probe 1 can be detected by either the abnormal pressure or the abnormal mass flow rate in the same manner as described above.

Figure 15:
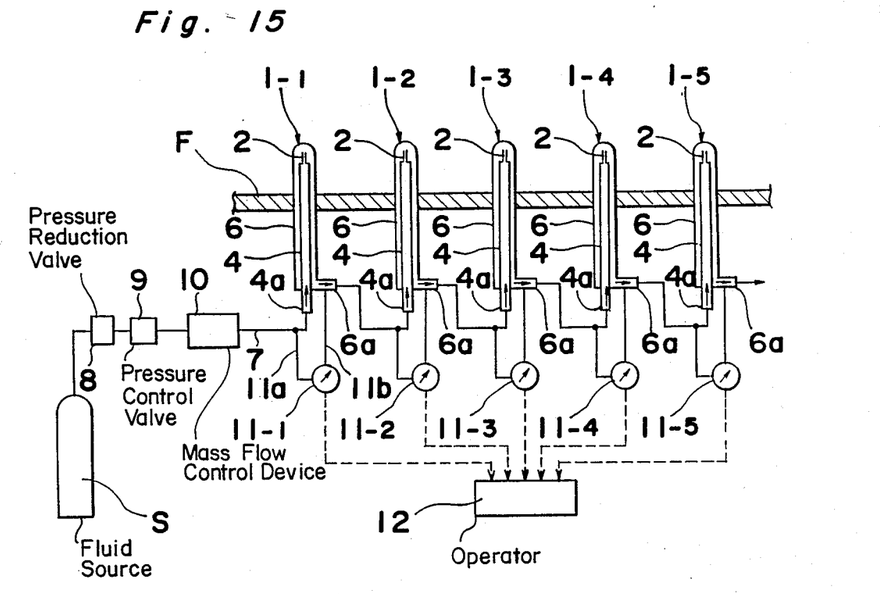
FIG. 15 is a schematic view of a multi-temperature detecting apparatus employing the method of measuring temperature according to the present invention.

FIG. 15 illustrates a multi-temperature measuring apparatus on the basis of the method of measuring temperature according to the present invention.

The multi-temperature measuring apparatus of FIG. 15 is provided with five probe comprising a first, a second, a third, a fourth and a fifth probe 1-1, 1-2, 1-3, 1-4 and 1-5, as the temperature-sensitive sensors, where the probes are connected with one another in series. More specifically, each probe 1-1, 1-2, 1-3 or 1-4 exclusive of the fifth probe 1-5 is connected at its discharge port 6a of the working fluid which is the outlet portion of the external cylinder 6 of the probe 1-1, 1-2, 1-3 or 1-4 with the supply port 4a of the working fluid of the adjacent probe 1-2, 1-3, 1-4 or 1-5 which port is the inlet portion of the internal cylinder 4. The supply port 4a of the working fluid of the first probe 1-1 is coupled to a supply tube or piping 7 for supplying the working fluid to the first probe 1-1 and the discharge port 6a of the working fluid of the fifth probe 1-5 is open to the atmosphere. In the above-mentioned arrangement, the working fluid is caused to flow at the constant mass flow rate from the source S of the workig fluid towards the internal cylinder 4 of the first probe 1-1 sequentially through the reducing valve 8, the pressure control device 9, the mass flow control device 10 and the supply piping 7 of the working fluid. Each differential pressure gauge 11-1, 11-2, 11-3, 11-4 or 11-5 is coupled to the supply port 4a of the working fluid of the corresponding probe 1-1, 1-2, 1-3, 1-4 or 1-5 and to the discharge port 6a of these probes, respectively through the pressure detecting tubes 11a and 11b to directly detect the pressure drop $\Delta P$ across the capillary tube 2 within each 1. The pressure signals sent from the differential pressure gauges 11-1, 11-2, 11-3, 11-4 and 11-5 are applied to the temperature operating means 12.

The operation of temperature measurement using the apparatus having the above described construction will be explained below.

The working fluid, for example, Ar gas or the like, is initially supplied from the source S of the working fluid. The working fluid supplied is not only reduced in pressure to the predetermined value through the reducing valve 8 but also simultaneously controlled so as to be held at the constant pressure through the pressure control device 9. In this state, the working fluid is further supplied to the supply port 4a of the working fluid of the first probe 1-1 at the constant mass flow rate Q through the mass flow control device 10. It passes then through the capillary tube 2 to be discharged from the discharge port 6a of the working fluid of the first probe 1-1.

In this event, since the pressure drop $\Delta P1$ arises at the capillary tube 2, upon detection of the pressure drop $\Delta P1$ by the differential pressure gauge 11-1, the temperature T1 of the atmosphere at the location where the first probe 1-1 is provided is calculated by the temperature operating means 12 in accordance with the detected result. The working fluid discharged from the discharge port 6a of the working fluid of the first probe 1-1 is then supplied to the second probe 1-2 from the supply port 4a and passes through the capillary tube 2 within the second probe 1-2 to be discharged from the discharge port 6a. The capillary tube 2 within the probe 1-2 produces the pressure drop $\Delta P2$, and the temperature T2 of the atmosphere at a location where the second probe 1-2 is provided through calculation using the detected pressure drop $\Delta P2$, in the same way as described for the first probe 1-1.

Henceforth, the temperature measurement through detection of the pressure drop at the capillary tube is repeated until the working fluid has passed through the capillary tube 2-5 of the last probe, i.e. the fifth probe 1-5 in the arrangement shown in FIG. 15. The working fluid passed through each probe 1-1, 1-2, 1-3, 1-4 or 1-5 one by one is finally discharged to the atmosphere from the discharge port 6a of the fifth probe 1-5.

As described so far, according to the construction of the multi-temperature measuring apparatus of the present invention, since the pressure drop $\Delta P$ across the capillary tube 2 depends upon only the temperature of the working fluid at the time when the working fluid passes through it, the pressure drop $\Delta P$ never undergoes any influence from the progress of the temperature or pressure of the working fluid before it enters any one probe, the material, quality of the material or configuration of the probe, the environmental temperature around the material, the atmospheric pressure or the like. In other words, even if the working fluid has passed through a plurality of probes previously, this fact never exerts any influence upon the pressure drop of the working fluid at the time when it passes through the next probe. Accordingly, not only can the correct temperature measurement can be executed, but also a plurality of the temperature measurements corresponding to the number of the probes can be sequentially executed by providing the needed number of the probes at the locations required for the measurements.

Figure 16:
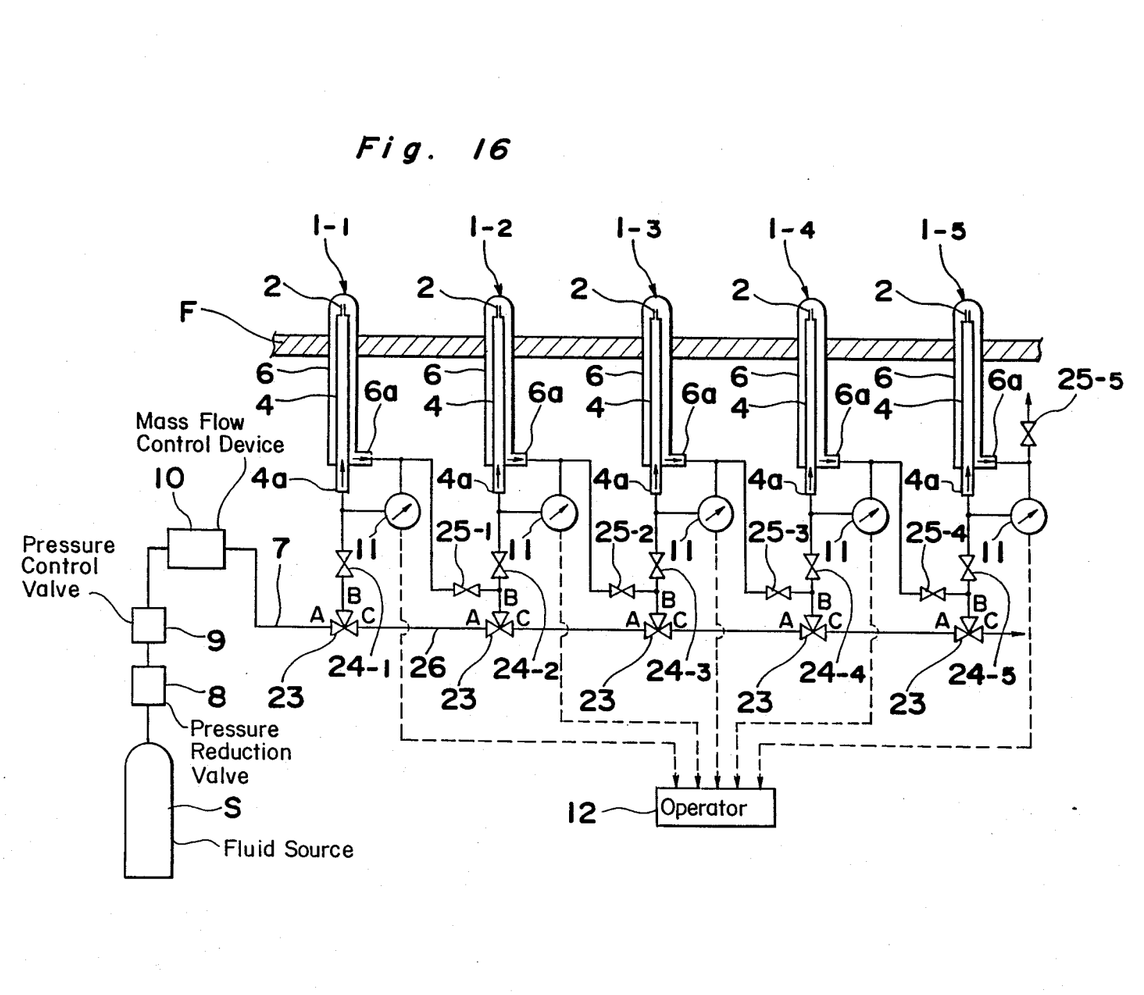
FIG. 16 is a schematic view showing a modification of FIG. 15.

In FIG. 16, there are additionally provided five three-way valves 23; five on-off valves 24-1, 24-2, 24-3, 24-4 and 24-5; and five by-pass valves 25-1, 25-2, 25-3, 25-4 and 25-5 including necessary pipings in the multi-temperature measuring apparatus shown in FIG. 15. Even when only the second probe 1-2 has been damage or intentionally out of use, for example, the temperature measurement can be continued without any influence upon the other probes 1-1, 1-3, 1-4 and 1-5.

It is noted that the multi-temperature measuring apparatus shown in FIG. 16 may be further provided with the probe damage detecting means 15a, 15b, 15c, or 15d for detecting the damage of any of the probes 1-1, 1-2, 1,3, 1-4 or 1-5. In this case, when the damage of any probe has been detected, the above described on-off valve, the by-pass valve and the three-way valve corresponding to the probe subjected to the damage are operated by the signal sent from the comparative operation processing circuit 17a or 17b.

It is also noted that in either of the embodiments described so far, the pressure detecting tube 11b on the low pressure side is connected to the differential pressure gauge 11, it may be open to the atmosphere in the case where the fluctuation of the atmospheric pressure including that caused by any noise is negligibly small or extremely slow in fluctuating rate.

Figure 17:
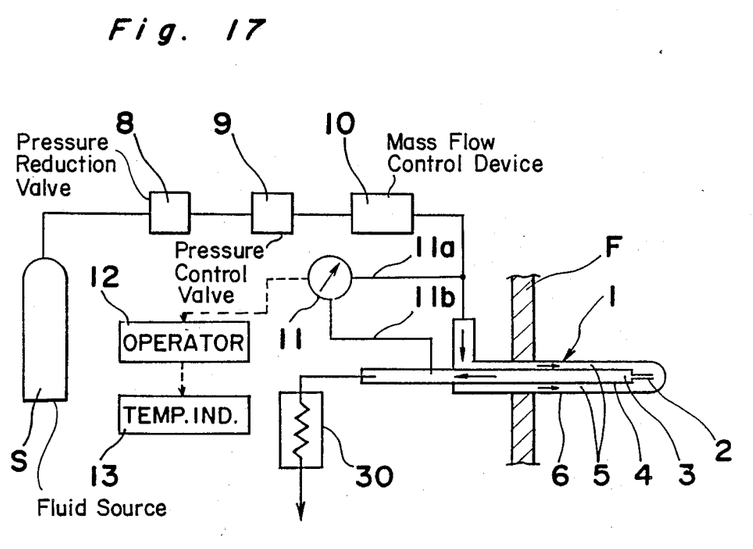
FIG. 17 is a schematic view showing a silencer as a fluidic resistance means at the downstream side of the working fluid.
Figure 18:
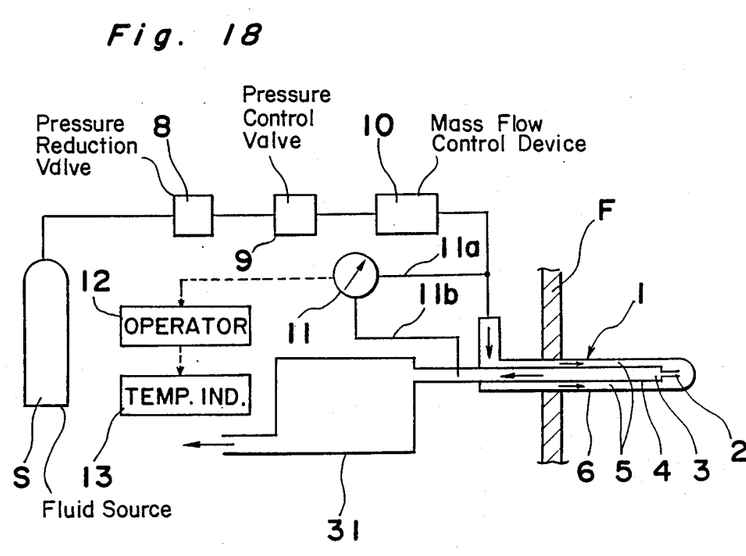
FIG. 18 is a schematic view showing an accumulator in place of the silencer of FIG. 17 at the downstream side of the working fluid.

It is further noted that there may be provided a resistance means 30 such as a silencer producing a large flow resistance, as shown in FIG. 17, or an accumulator 31 for accumulating the working fluid to be discharged, as shown in FIG. 18. In either of these two cases in contrast with the aforementioned case, even if the atmospheric pressure violently fluctuates, a hunting phenomenon hardly takes place with respect to the output from the measuring apparatus. As for the hunting, not only it can be physically restricted in a manner as shown in FIG. 17 or 18, but also it may be electrically eliminated in a manner that the electric signal picked up from the differential pressure gauge 11 is caused to pass through a filter circuit.

As clearly shown in the above description, according to the method of the present invention, the working fluid is supplied at a constant mass flow rate into a flow channel which defines a throttle portion at a temperature-sensitive portion and upon measurement of a pressure difference between opposite ends of the throttle portion, the temperature can be recognized through calculations using the measured pressure difference.

Furthermore, according to the temperature measuring apparatus of the present invention employed for utilizing the above-mentioned method, there are provided a source of a working fluid; a probe having an external cylinder closed at one of its end and an internal cylinder which is accommodated in the external cylinder and has a capillary tube at its forward end; a supply piping of the working fluid for introducing the working fluid from the source into either the internal cylinder or the external cylinder; a pressure control device and a mass flow control device disposed in series with the supply piping; a differential pressure gauge for detecting a pressure drop across the capillary tube, and a temperature calculating means for operating the temperature on the basis of a signal sent from the differential pressure gauge.

Consequently, by making use of the method and apparatus of the present invention, it is possible to achieve the temperature measurement with high reliability even at the high temperature in a range of 1500° to 3000° C., without any influence from the environmental temperature or the temperature of the working fluid, notwithstanding the apparatus is simple in construction.

When a probe damage detecting means for detecting the damage of the probe is additionally provided, allowing the damage to the probe to be readily detected, an erroneous measurement can be advantageously prevented.

In addition, the present invention provides a fluidic resistance type temperature measuring apparatus including a source of supply of a working fluid, a plurality of probes connected in series with each other and each probe having an external cylinder closed at its one end and an internal cylinder which is accommodated in the external cylinder and havng a capillary tube at its forward end; a supply piping of the working fluid connected to a first probe to introduce the working fluid from the source to the first probe; a pressure control device and a mass flow control device disposed in series with the supply tube, a plurality of differential pressure gauges, each gauge corresponding to each probe to detect a pressure drop across the capillary tube; and a temperature operating means for calculating the temperatures on the basis of signals sent from the respective differential pressure gauges.

As a result, since the working fluid supplied to each probe flows at a constant mass flow rate at all times, sequential temperature measurements can be executed with excellent accuaracy at a plurality of locations which are high in temperature, with the working fluid being effectively utilized.

Although the present invention has been fully described by way of examples with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A fluidic resistance type temperature measuring apparatus for measuring a temperature, comprising:
   a source of a working fluid;
   temperature-sensitive means for providing a pressure drop for said working fluid;
   said temperature-sensitive means including,
   an external cylinder closed at one of its end,
   an internal cylinder disposed inside said external cylinder, and
   a capillary tube positioned at a forward end of said internal tube,
   said capillary tube and said external cylinder having a structural relationship such that said pressure drop is generated across said capillary tube;
   a supply tube for introducing said working fluid from said source into said internal cylinder;
   pressure control means, disposed in series with said supply tube, for controlling said working fluid pressure;
   mass flow control means, disposed in series with said supply tube and said pressure control means, for controlling said working fluid's mass flow rate;
   differential pressure gauge means, operatively connected to said temperature-sensitive means, for detecting said pressure drop across said capillary tube and for providing an output signal corresponding to said pressure drop; and temperature determining means, operatively connected to said differential pressure gauge means, for determining the temperature in accordance with said output signal from said differential pressure gauge means.

2. The fluidic resistance type temperature measuring apparatus as claimed in claim 1, further comprises:
damage detecting means for detecting damage to said temperature-sensitive means;
said damage detecting means including,
calculating means for calculating a fluctuating rate of said output signal from said differential pressure gauge, and
judging means for judging whether said temperature-sensitive means is damaged by comparing the calculated fluctuating rate with a predetermined reference fluctuating rate.

3. The fluidic resistance type temperature measuring apparatus as claimed in claim 1, further comprises:
damage detecting means for detecting damage to said temperature-sensitive means;
said damage detecting means including,
judging means for judging whether said temperature-sensitive means is damaged by comparing a mass flow rate of said working fluid supplied into said temperature-sensitive means and a mass flow rate of said working fluid discharged from said temperature-sensitive means.

4. A fluidic resistance type temperature measuring apparatus for measuring a temperature, comprising:
a source of a working fluid;
temperature-sensitive means for providing a pressure drop for said working fluid;
said temperature-sensitive means including,
an external cylinder closed at one of its ends;
an internal cylinder disposed inside said external cylinder, and
a capillary tube positioned at a forward end of said internal tube,
said capillary tube and said external cylinder having a structural relationship such that said pressure drop is generated across said capillary tube;
a supply tube for introducing said working fluid from said source into said external cylinder;
a pressure control means, disposed in series with said supply tube, for controlling said working fluid's pressure;
mass flow control means, disposed in series with said supply tube and said pressure control means, for controlling said working fluid's mass flow rate;
differential pressure gauge means for detecting said pressure drop across said capillary tube and for providing an output signal corresponding to said pressure drop; and
temperature operating means for determining the temperature in accordance with said output signal from said differential pressure gauge means.

5. The fluidic resistance type temperature measuring apparatus as claimed in claim 4, further comprises:
damage detecting means for detecting damage to said temperature-sensitive means;
said damage detecting means including,
calculating means for calculating a fluctuating rate of said output signal from said differential pressure gauge, and
judging means for judging whether said temperature-sensitive means is damaged by comparing the calculated fluctuating rate with a predetermined reference fluctuating rate.

6. The fluidic resistance type temperature measuring apparatus as claimed in claim 4, further comprises:
damage detecting means for detecting damage to said temperature-sensitive means;
said damage detecting means including,
judging means for judging whether said temperature-sensitive means is damaged by comparing a mass flow rate of said working fluid supplied into said temperature-sensitive means and a mass flow rate of said working fluid discharged from said temperature-sensitive means.

7. A fluidic resistance type temperature measuring apparatus for measuring temperatures, comprising:
a source of a working fluid;
a plurality of temperature-sensitive means, connectively disposed in series with said source, for providing a plurality of pressure drops for said working fluid;
each temperature-sensitive means including,
an external cylinder closed at one of its ends;
an internal cylinder disposed inside said external cylinder, and
a capillary tube positioned at a forward end of said internal tube,
said capillary tube and said external cylinder having a structural relationship such that said pressure drop is generated across said capillary tube;
a supply tube connected to a first temperature-sensitive means to introduce said working fluid from said source into said first temperature-sensitive means;
pressure control means, disposed in series with said supply tube, for controlling said working fluid's pressure;
mass flow control means, disposed in series with said supply tube and said pressure control means, for controlling said working fluid's mass flow role;
a plurality of differential pressure gauge means, for determining said pressure drop across said capillary tube and for providing an output signal corresponding to said pressure drop, each differential pressure gauge means operatively connected to an individual temperature-sensitive means;
temperature determining means, operatively connected to said plurality of differential pressure gauge means, for determining the temperatures in accordance with said output signals from said differential pressure gauge means.

* * * * *